(12) United States Patent
Kim et al.

(10) Patent No.: US 10,484,150 B2
(45) Date of Patent: Nov. 19, 2019

(54) CONTINUOUS RETRANSMISSION IN WI-FI SYSTEMS

(71) Applicant: Apple Inc., Cupertino, CA (US)

(72) Inventors: Yuchul Kim, Santa Clara, CA (US); Joonsuk Kim, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 63 days.

(21) Appl. No.: 15/341,301

(22) Filed: Nov. 2, 2016

(65) Prior Publication Data

US 2017/0126364 A1 May 4, 2017

Related U.S. Application Data

(60) Provisional application No. 62/250,160, filed on Nov. 3, 2015.

(51) Int. Cl.
*H04L 1/18* (2006.01)
*H04L 12/741* (2013.01)
*H04W 84/12* (2009.01)

(52) U.S. Cl.
CPC ............ *H04L 1/189* (2013.01); *H04L 1/1887* (2013.01); *H04L 45/74* (2013.01); *H04W 84/12* (2013.01)

(58) Field of Classification Search
CPC ... H04L 1/08; H04L 1/18; H04L 1/189; H04L 1/1816; H04L 1/1887; H04L 5/0007; H04L 5/0055; H04L 12/741; H04L 45/74; H04W 28/04; H04W 52/48; H04W 72/0446; H04W 74/0816; H04W 84/12; H04W 88/08
See application file for complete search history.

(56) References Cited

U.S. PATENT DOCUMENTS

| | | | | |
|---|---|---|---|---|
| 5,715,257 | A * | 2/1998 | Matsuki | H04L 1/1664 714/748 |
| 7,664,031 | B2 * | 2/2010 | Davis | H04L 41/26 370/230 |
| 8,171,365 | B2 * | 5/2012 | Nabetani | H04L 1/188 714/748 |
| 8,781,035 | B2 | 7/2014 | Cheng et al. | |
| 8,837,515 | B1 | 9/2014 | Cai et al. | |
| 8,908,655 | B2 * | 12/2014 | Futagi | H04J 13/0059 370/336 |
| 9,781,670 | B2 * | 10/2017 | Seok | H04W 52/0216 |
| 9,860,921 | B2 * | 1/2018 | Kim | H04W 74/085 |
| 9,866,359 | B2 * | 1/2018 | Seok | H04L 5/0055 |
| 2004/0017790 | A1 * | 1/2004 | del Prado | H04W 28/22 370/333 |

(Continued)

*Primary Examiner* — Sulaiman Nooristany
(74) *Attorney, Agent, or Firm* — Meyertons Hood Kivlin Kowert and Goetzel PC; Jeffrey C. Hood

(57) ABSTRACT

This disclosure relates to performing retransmissions in a wireless communication system by a wireless device. A wireless device may receive a first transmission of a data frame according to a wireless communication technology. The wireless device may attempt to decode the data frame. It may be determined that attempting to decode the data frame is unsuccessful. A retransmission of the data frame may be received at a retransmission interval after the first transmission of the data frame. The retransmission interval may be less than a minimum interframe interval for contending for medium access for new transmissions according to the wireless communication technology.

20 Claims, 4 Drawing Sheets

(56) References Cited

U.S. PATENT DOCUMENTS

| | | | |
|---|---|---|---|
| 2004/0023665 A1* | 2/2004 | Simmonds | H04L 1/1854 455/456.1 |
| 2005/0157747 A1* | 7/2005 | Yang | H04W 74/085 370/465 |
| 2005/0270975 A1* | 12/2005 | Meylan | H04L 47/14 370/229 |
| 2006/0126497 A1* | 6/2006 | Na | H04L 1/1887 370/216 |
| 2008/0037420 A1* | 2/2008 | Tang | H04L 1/1607 370/229 |
| 2008/0186945 A1* | 8/2008 | Ahn | H04L 1/16 370/349 |
| 2008/0212613 A1* | 9/2008 | Perkinson | H04L 47/10 370/475 |
| 2009/0016265 A1* | 1/2009 | Katayama | H04L 1/1819 370/328 |
| 2010/0165907 A1* | 7/2010 | Chu | H04L 12/1868 370/312 |
| 2010/0182946 A1* | 7/2010 | Ni | H04B 7/15592 370/315 |
| 2010/0278121 A1* | 11/2010 | Chun | H04L 1/1887 370/329 |
| 2012/0089882 A1* | 4/2012 | Kim | H04L 1/1812 714/748 |
| 2013/0051335 A1* | 2/2013 | Adachi | H04W 74/0808 370/329 |
| 2013/0230040 A1* | 9/2013 | Adachi | H04W 52/0209 370/349 |
| 2014/0071874 A1* | 3/2014 | Li | H04N 19/65 370/311 |
| 2015/0071276 A1* | 3/2015 | Kim | H04L 1/1845 370/338 |
| 2015/0139201 A1* | 5/2015 | Ko | H04W 74/0816 370/336 |
| 2015/0236822 A1* | 8/2015 | Pirskanen | H04L 1/1812 370/329 |
| 2015/0349932 A1* | 12/2015 | Onodera | H04W 16/28 370/329 |
| 2015/0351128 A1* | 12/2015 | Kim | H04W 74/085 370/329 |
| 2016/0050049 A1 | 2/2016 | Yang et al. | |
| 2016/0197705 A1* | 7/2016 | Ryu | H04L 1/18 370/242 |
| 2016/0270118 A1 | 9/2016 | He et al. | |
| 2016/0316458 A1 | 10/2016 | Kwon et al. | |
| 2016/0335147 A1* | 11/2016 | Asterjadhi | G06F 11/0709 |
| 2017/0019927 A1* | 1/2017 | Kim | H04L 5/0055 |
| 2017/0104563 A1* | 4/2017 | Lee | H04L 5/0044 |
| 2017/0230977 A1* | 8/2017 | Shen | H04W 4/70 |
| 2017/0339692 A1* | 11/2017 | Chun | H04W 72/0446 |
| 2018/0026703 A1* | 1/2018 | Bhargava | H04W 72/085 |

\* cited by examiner

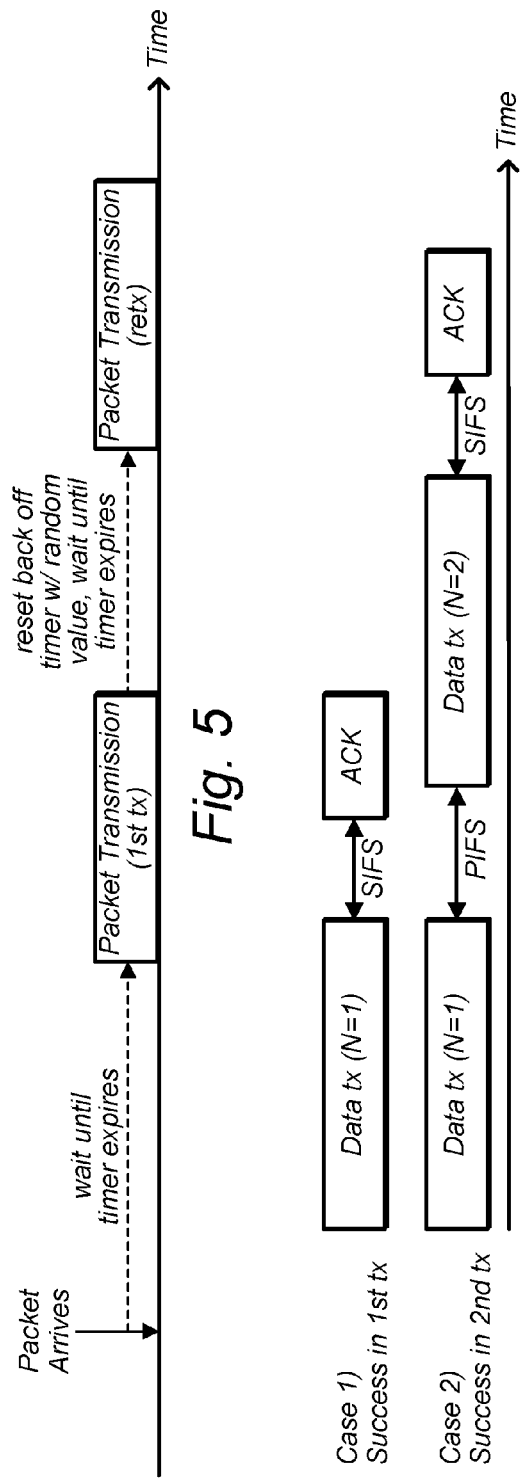

CONTINUOUS RETRANSMISSION IN WI-FI SYSTEMS

PRIORITY INFORMATION

This application claims priority to U.S. provisional patent application Ser. No. 62/250,160, entitled "Continuous Retransmission in Wi-Fi Systems," filed Nov. 3, 2015, which is hereby incorporated by reference in its entirety as though fully and completely set forth herein.

FIELD

The present disclosure relates to wireless communication, including techniques for performing continuous retransmissions in wireless networks.

DESCRIPTION OF THE RELATED ART

Wireless communication systems are rapidly growing in usage. Additionally, there exist numerous different wireless communication technologies and standards. Some examples of wireless communication standards include GSM, UMTS (associated with, for example, WCDMA or TD-SCDMA air interfaces), LTE, LTE Advanced (LTE-A), 3GPP2 CDMA2000 (e.g., 1×RTT, 1×EV-DO, HRPD, eHRPD), IEEE 802.11 (WLAN or Wi-Fi), IEEE 802.16 (WiMAX), Bluetooth, and others.

In some wireless communication systems, such as at least some versions of IEEE 802.11 (Wi-Fi), packet retransmissions are performed with similar priority as new packet transmissions. This can lead to interleaving of other transmissions between the initial transmission of a packet and one or more retransmissions of the same packet.

SUMMARY

This document describes, inter alia, methods for performing retransmissions in wireless communication systems, and describes wireless devices configured to implement the described methods.

According to the techniques proposed herein, packet retransmissions may be performed at a different interval than initial packet transmissions. This may effectively provide retransmissions with a higher priority level than new packet transmissions, and may facilitate the continuous transmission of an initial transmission and any retransmissions of each data packet in the wireless communication system without interleaving of other data packets. This may in turn improve overall system throughput, at least in some embodiments.

Further, such an arrangement that allows for continuous packet retransmissions may facilitate the use by receiving devices of receive/chase combining, at the physical layer, with reduced likelihood of buffer corruption. For example, a receiver that can determine whether a transmission is an initial transmission or a retransmission based at least in part on the interval between transmissions with which it is received, and which can safely assume that other wireless devices' communications are not interleaved between the initial transmission and any retransmissions of a given packet due to the higher priority given to packet retransmissions, may be able to avoid potential buffer corruption that could occur when other wireless devices' communications can be interleaved between the initial transmission and any retransmissions of a given packet, at least in some embodiments.

The techniques described herein may be implemented in and/or used with a number of different types of devices, including but not limited to access point devices, cellular phones, portable media players, portable gaming devices, tablet computers, wearable computing devices, remote controls, wireless speakers, set top box devices, television systems, and computers.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of the preferred embodiment is considered in conjunction with the following drawings, in which:

FIGS. 5-6 illustrate exemplary possible wireless communication retransmission timelines;

FIG. 7 is a table illustrating exemplary possible NPI and ITI frameworks for distinguishing between new packet transmissions and packet retransmissions.

Figure 1:
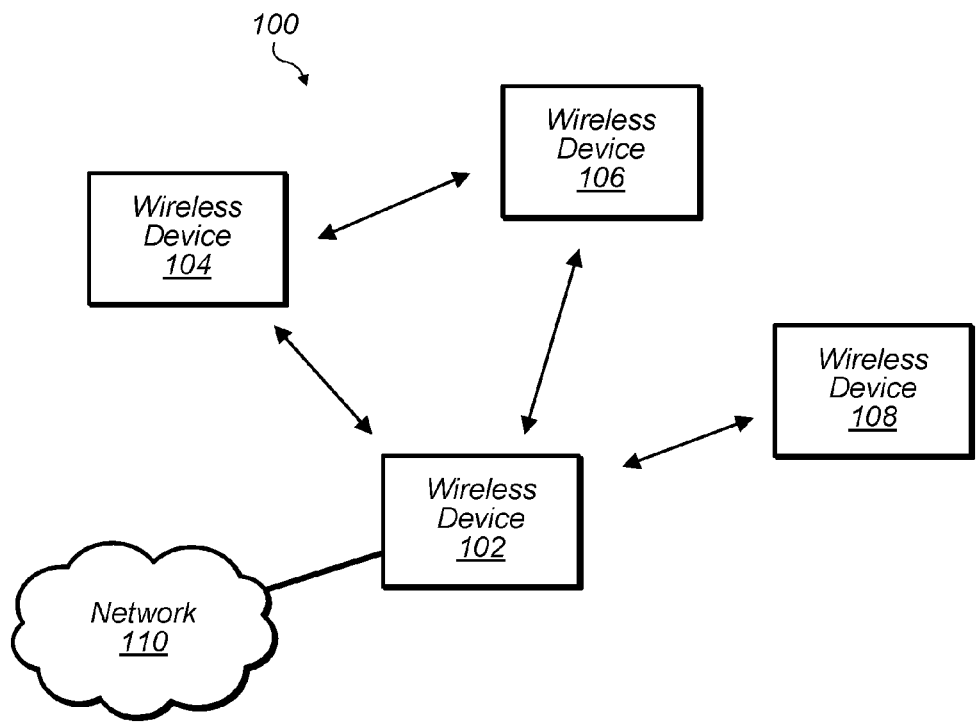
FIGS. 1-2 illustrate exemplary (and simplified) wireless communication systems.

While the features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Terms

The following is a glossary of terms used in the present disclosure:

Memory Medium—Any of various types of non-transitory computer accessible memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic."

Computer System—any of various types of computing or processing systems, including a personal computer system (PC), mainframe computer system, workstation, network appliance, Internet appliance, personal digital assistant (PDA), personal communication device, smart phone, television system, grid computing system, or other device or combinations of devices. In general, the term "computer system" can be broadly defined to encompass any device (or combination of devices) having at least one processor that executes instructions from a memory medium.

Wireless Device or Station (STA)—any of various types of computer systems or devices that perform wireless communications. Examples of wireless devices include mobile telephones or smart phones (e.g., iPhone™, Android™-based phones), portable gaming devices (e.g., Nintendo DS™, PlayStation Portable™, Gameboy Advance™, iPhone™), wearable devices (e.g., smart watch, smart glasses), laptops, PDAs, portable Internet devices, music players, data storage devices, or other handheld devices, access point devices, etc. A wireless device can be portable (or mobile) or may be stationary or fixed at a certain location.

Base Station or Access Point (AP)—The term "Base Station" has the full breadth of its ordinary meaning, and at least includes a wireless communication station installed at a fixed location and used to communicate as part of a wireless telephone system or radio system.

Processing Element—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

PHY rate or PHY data rate—A rate at which devices communicate with each other over a medium. Many wireless communication technologies (including IEEE 802.11) may provide for the use of different combinations of modulation type, coding rate, numbers of spatial streams, channel widths, and/or other physical layer characteristics. Each such combination may result in (and in some cases be referred to as) a "PHY rate". The combination of physical layer characteristics which result in a given PHY rate may also be referred to as a "modulation and coding scheme", "MCS", or "MCS index". "Lower" or "more robust" PHY rates/MCS indices may provide receivers with greater capability to successfully receive information being communicated under less-than-ideal medium conditions than "higher" or "less robust" PHY rates (e.g., by using a lower density modulation scheme and/or including a greater proportion of error correction coding information), often at a cost of potential throughput. Higher or less robust PHY rates may, in contrast, provide more efficient medium use and provide greater throughput than lower PHY rates (e.g., by using a higher density modulation scheme and/or including a lesser proportion of error correction coding information), but may be more difficult to receive under less-than-ideal medium conditions.

IEEE 802.11—refers to technology based on Institute of Electrical and Electronics Engineers (IEEE) 802.11 wireless standards such as 802.11a, 802.11.b, 802.11g, 802.11n, 802.11-2012, 802.11ac, and/or other IEEE 802.11 standards. IEEE 802.11 technology may also be referred to as "Wi-Fi" or "wireless local area network (WLAN)" technology.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112, paragraph six, interpretation for that component.

Figure 2:
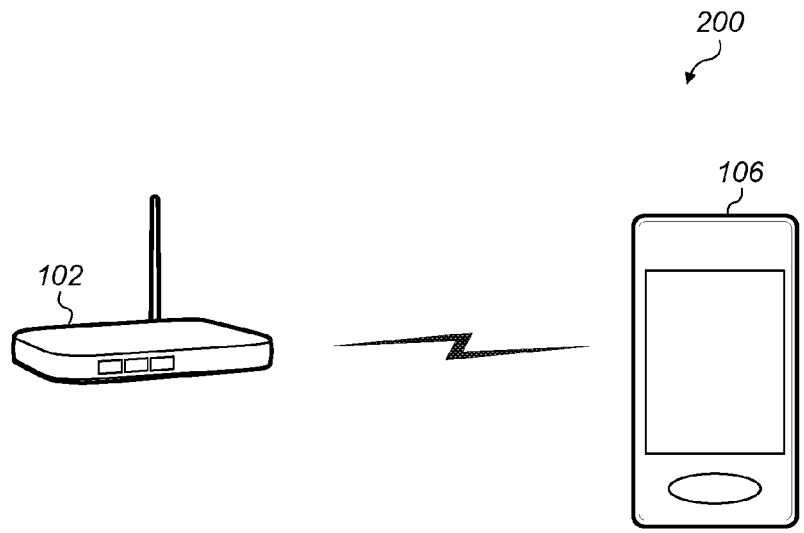

FIGS. 1-2—Communication System

FIG. 1 illustrates an exemplary (and simplified) wireless communication system 100 in which aspects of the present disclosure may be implemented, according to some embodiments. It is noted that the system 100 of FIG. 1 is only one example of a possible system, and embodiments may be implemented in any of various systems, as desired. For example, note that although the exemplary wireless communication system 100 illustrated in FIG. 1 is shown as including four wireless devices, aspects of the disclosure may be implemented in wireless communication systems having greater or fewer numbers (i.e., any arbitrary number) of wireless devices.

As shown, the exemplary wireless communication system 100 includes multiple wireless devices 102, 104, 106, 108, which can communicate over at least one transmission medium. Some or all of the wireless devices may be substantially mobile devices. Alternatively, or in addition, some or all of the wireless devices may be substantially stationary.

The wireless devices 102-108 may communicate over the wireless transmission medium in such a manner as to form a wireless network. The wireless network may be an IEEE 802.11 'infrastructure mode' network provided by a dedicated access point (e.g., wireless device 102); alternatively, the wireless network may be an 'ad-hoc' or peer-to-peer based network. Note that it may be possible that the wireless network may include one or more 'hidden nodes'; for example, as shown, wireless device 108 may be within communication range of wireless device 102, but may not be able to detect (and/or be detected by) wireless devices 104 and 106. Wireless device 108 may, however, be able to indirectly detect wireless devices 104 and 106, e.g., via wireless device 102. The wireless devices 102-108 may be configured to perform IEEE 802.11 (Wi-Fi) wireless communication and/or other forms of wireless communication according to aspects of the present disclosure.

One or more of the wireless devices may be equipped to communicate with one or more external networks. For example, as shown, wireless device 102 may be communicatively coupled to network 110. The external network(s) may be any of a variety of types of networks, such as a cellular service provider's core network, the Internet, or an organization's intranet, among various possibilities.

Note that one or more of the wireless devices 102-108 may be capable of communicating using multiple wireless communication standards. For example, one or more of the wireless devices 102-108 may be configured to communicate using at least one wireless networking protocol (e.g., Wi-Fi) and/or peer-to-peer wireless communication protocol (e.g., BT, Wi-Fi peer-to-peer, etc.) and at least one cellular communication protocol (e.g., GSM, UMTS, LTE, LTE-Advanced (LTE-A), HSPA, 3GPP2 CDMA2000 (e.g., 1xRTT, 1xEV-DO, HRPD, eHRPD), etc.). Any or all of wireless devices 102-108 may also or alternatively be configured to communicate using one or more global navigational satellite systems (GNSS, e.g., GPS or GLONASS), one or more mobile television broadcasting standards (e.g., ATSC-M/H or DVB-H), and/or any other wireless communication protocol, if desired. Other combinations of wireless communication standards (including more than two wireless communication standards) are also possible.

Any or all of the wireless devices 102-108 and/or the network 110 illustrated in FIG. 1 may be configured to implement or support implementation of part or all of the methods described herein.

FIG. 2 illustrates an exemplary wireless communication system 200 in which possible example aspects of the system 100 of FIG. 1 are represented, according to some embodiments. As shown, in the illustrated system wireless device 106 may be a mobile station (STA) 106 and wireless device 102 may be an access point 102 (also referred to as an "AP", or alternatively as a "base station" or "BS"). The mobile STA 106 may be a user device with Wi-Fi communication capability such as a mobile phone, a hand-held device, a wearable device, a computer or a tablet, fixed wireless device, or virtually any type of wireless device. The AP 102 may be an access point device with Wi-Fi communication capability such as a wireless router or other wireless access point.

Either or both of the AP 102 and the mobile STA 106 may include a processor that is configured to execute program instructions stored in memory. Either or both of the AP 102 and the mobile STA 106 may perform any of the method embodiments described herein by executing such stored instructions. Alternatively, or in addition, a programmable hardware element such as an FPGA (field-programmable gate array) that is configured to perform any of the method embodiments described herein, or any portion of any of the method embodiments described herein, may be included as part of the AP 102 and/or the mobile STA 106.

Figure 3:
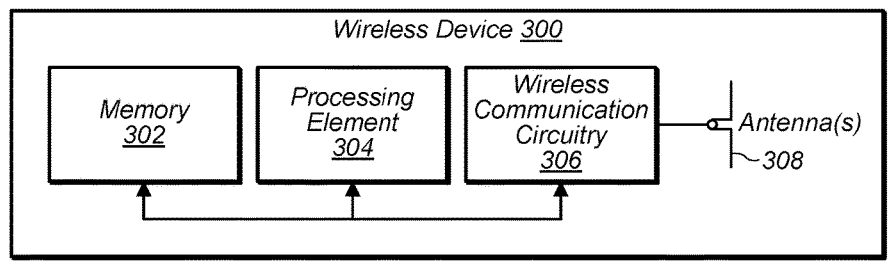
FIG. 3 illustrates a block diagram of an exemplary wireless device.

FIG. 3—Exemplary Block Diagram of a Wireless Device

FIG. 3 illustrates an exemplary block diagram of a wireless device 300 that may be configured for use in conjunction with various aspects of the present disclosure. The device 300 may be any of a variety of types of device and may be configured to perform any of a variety of types of functionality. For example, the device 300 may be a substantially portable device (a mobile device), such as a mobile phone, a personal productivity device, a computer or a tablet, a handheld gaming console, a portable media player, etc. Alternatively, the device 300 may be a substantially stationary device, such as a television, a subwoofer, speaker, or other audio rendering device, a wireless access point, a set-top box, etc.

As shown, the device 300 may include a processing element 304. The processing element 304 may include or be coupled to one or more local and/or system memory elements, such as memory 302. Memory 302 may include any of a variety of types of memory and may serve any of a variety of functions. For example, memory 302 could be RAM serving as a system memory for processing element 304. Other types and functions are also possible.

The device 300 may also include wireless communication circuitry 306. The wireless communication circuitry 306 may include analog and/or digital circuitry components, and include one or more radios. In general, a radio may include any combination of a baseband processor, analog RF signal processing circuitry (e.g., including filters, mixers, oscillators, amplifiers, etc.), or digital processing circuitry (e.g., for digital modulation as well as other digital processing). The radio may implement one or more receive and transmit chains using the aforementioned hardware. In some instances, the wireless device 300 may share one or more parts of a receive and/or transmit chain between multiple wireless communication technologies, such as those discussed previously herein. The wireless communication circuitry may include or be coupled to one or more antennas 308.

Note that, if desired, the wireless communication circuitry 306 may include a discrete (on-board) processing element in addition to processing element 304; for example, processing element 304 may be an 'application processor' while wireless communication circuitry 306 may include its own 'baseband processor'; alternatively (or in addition), processing element 304 may providing processing capability for the wireless communication circuitry 306. The device 300 may be capable of communicating using any of various wireless communication technologies by way of wireless communication circuitry 306 and antenna(s) 308.

The device 300 may additionally include any of a variety of other components (not shown) for implementing device functionality, e.g., depending on the intended functionality of the device 300, which may include further processing and/or memory elements, one or more power supply elements (which may rely on battery power and/or an external power source) user interface elements (e.g., display, speaker, microphone, camera, keyboard, mouse, touchscreen, etc.), additional communication elements (e.g., additional antenna(s) for wireless communication, I/O ports for wired communication, communication circuitry/controllers, etc.) and/or any of various other components.

The components of the device 300, such as processing element 304, memory 302, wireless communication circuitry 306, and antenna(s) 308, may be operatively coupled via one or more intra-chip or inter-chip interconnection interfaces, which may include any of a variety of types of interface, possibly including a combination of multiple types of interface. As one example, a USB high-speed inter-chip (HSIC) interface may be provided for inter-chip communications between processing element 304 and wireless communication circuitry 306. Alternatively (or in addition), a universal asynchronous receiver transmitter (UART) interface, a serial peripheral interface (SPI), inter-integrated circuit (I2C), system management bus (SMBus), and/or any of a variety of other communication interfaces may be used for communications between processing element 304, memory 302, wireless communication circuitry 306, and/or any of various other device components. Other types of interfaces (e.g., peripheral interfaces for communication with peripheral components within or external to device 300, etc.) may also be provided as part of device 300.

As described herein, the device 300 may include hardware and software components for implementing features for performing continuous retransmissions in wireless communication systems.

Figure 4:
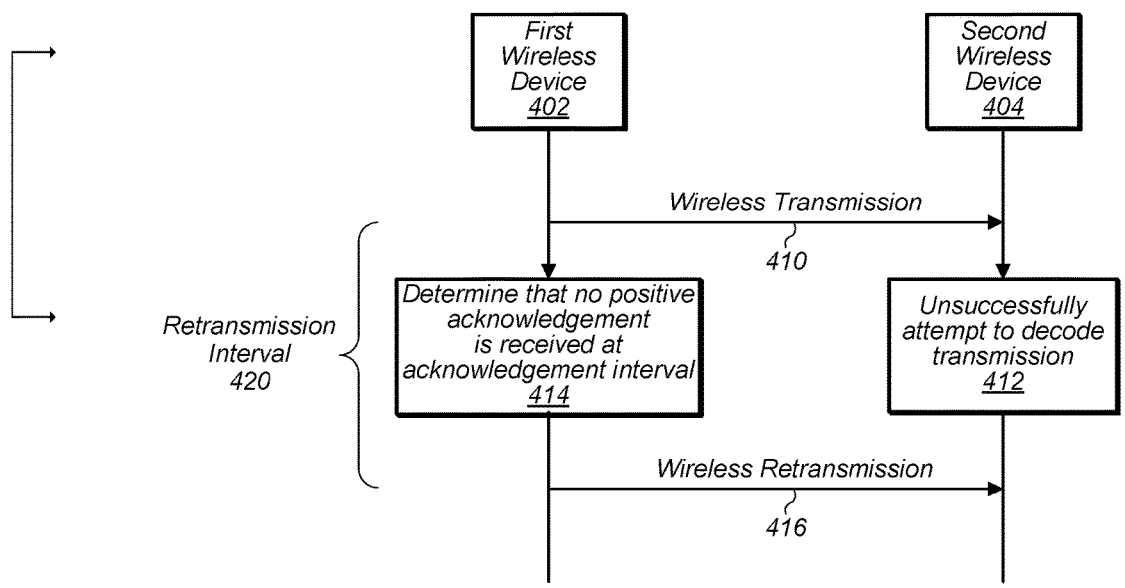
FIG. 4 is a communication flow diagram illustrating an exemplary method for performing continuous retransmissions in a wireless communication system.

FIG. 4—Communication Flow Diagram

In IEEE 802.11 (Wi-Fi) systems, at least in some instances a distributed medium access control (MAC) mechanism may be used to determine packet transmission timing between devices contending for medium access. For example, a listen-before-talk technique can be implemented such that a node in such a Wi-Fi network performs carrier sensing prior to attempting to perform a transmission using the Wi-Fi network medium. If no communications or other such signals are sensed, the node may count down its backoff timer(s) (which may initially have been randomly selected from certain specified possible values). If any communications are sensed prior to the backoff timer expiring, the backoff timer may be paused until the medium is determined to be free again. Once the backoff timer expires, the node may begin transmitting, e.g., a packet.

If such a technique is applied for all transmissions, including retransmissions, it may be the case that other nodes in a wireless network may seize the wireless medium in between a transmission and a corresponding retransmission. More generally, due to the random backoff between the initial transmission and a corresponding retransmission (and also between the Nth retransmission and the N+1th retransmission), packet transmission delay may be increased, and throughput may be decreased, for example relative to a system in which retransmissions are performed continuously until successful packet reception and decoding is achieved (or possibly until a maximum number of retransmissions have been attempted).

FIG. 4 is a communication flow diagram illustrating a method for performing continuous retransmissions in a wireless communication system. In various embodiments, some of the elements of the methods shown may be performed concurrently, in a different order than shown, may be substituted for by other method elements, or may be omitted. Additional method elements may also be performed as desired.

Aspects of the method of FIG. 4 may be implemented by a wireless device, such as any of the wireless devices 102, 104, 106, 108, 300 illustrated in and described with respect to FIGS. 1-3, or more generally in conjunction with any of the computer systems or devices shown in the above Figures, among other devices, as desired. Note that while at least some elements of the method of FIG. 4 are described in a manner relating to the use of communication techniques and/or features associated with IEEE 802.11 (Wi-Fi), such description is not intended to be limiting to the disclosure, and aspects of the method of FIG. 4 may be used in any suitable wireless communication system, as desired. As shown, the method may operate as follows.

A "first" wireless device 402, acting as a transmitting node, may perform an initial transmission of a data frame to a "second" wireless device 404, which may be the destination node for the data frame, according to a wireless communication technology (410). The wireless communication technology may be Wi-Fi (i.e., a version of IEEE 802.11), according to some embodiments, or may be any of various other possible wireless communication technologies.

The second wireless device 404 may receive the initial transmission and unsuccessfully attempt to decode the data frame (412). The wireless communication technology may include a mechanism for insuring reliability of data communications, such that if the data frame is successfully received and decoded by the second wireless device 404, the second wireless device 404 may transmit an acknowledgement to the first wireless device 402 at a specified acknowledgement interval (e.g., a short interframe space (SIFS) according to IEEE 802.11). Thus, the first wireless device 402 may be able to determine if no positive acknowledgement has been received by the first wireless device 402 by the time the specified acknowledgement interval has passed, and the first wireless device 402 may in turn determine that the second wireless device 404 has not successfully received the data frame (414).

The first wireless device 402 may perform a first retransmission of the data frame (416), e.g., based on determining that initial transmission of the data frame was not successfully received and decoded. The retransmission may be performed at a retransmission interval 420 that may be defined as being longer/greater than the acknowledgement interval, but shorter/lesser than a minimum interframe interval used for determining that the medium is free for new transmissions. For example, in a Wi-Fi system in which a distributed coordination function (DCF) interframe space (DIFS) is used as the minimum interframe interval for determining that the medium is free, an intermediate interval such as a point coordination function (PCF) interframe space (PIFS) may be used as the retransmission interval. In at least some implementations, this allows retransmissions to be performed with higher priority than new transmissions and may reduce (and possibly eliminate) collisions between retransmissions and new transmissions. For example, as other nodes may be required to wait at least the DIFS before starting a new transmission, the on-going transmission may be able to finish without competition before any new transmissions occur. This may result in higher overall throughput in the wireless communication system, and may result in lower delays for receiving individual packets, at least in some embodiments.

Note that such retransmission timing may further be used for subsequent/additional retransmissions, at least in some embodiments, potentially also providing priority to such additional retransmissions and protecting them from being interleaved with other transmissions. For example, if the second wireless device 404 is not able to successfully decode the first retransmission such that the first wireless device does not receive an acknowledgement at the acknowledgement interval after performing the first retransmission, the first wireless device 402 may perform a second retransmission of the data frame at the retransmission interval after performing the first retransmission. Any number of further retransmissions may be performed in a similar manner, e.g., up to a specified maximum number of retransmissions for a given data frame according to the wireless communication technology.

Such a framework may also enable receivers to use "receive combining" or "chase combining" with low risk of buffer corruption, at least in some embodiments. Receive combining is a technique that can make use of unsuccessful transmissions to improve decoding performance at a receiver, e.g., increasing the likelihood of successful decoding of retransmissions. In order to effectively perform receive combining, it may be important to be able to identify when two physical layer packets are identical and can be combined (e.g., to avoid buffer corruption from incorrectly combining non-identical packets).

For example, a receiver can use any or all of transmitter address, receiver address, and indicator information indicating whether a packet is a new transmission or a retransmission to be able to determine whether to combine the packet with a buffered previously received packet that was unsuccessfully decoded. However, at least in some instances, while a new packet indicator (NPI) and/or an initial transmission indicator (ITI) may be used to indicate whether a packet is a new transmission or a retransmission, and (at least in some embodiments) at least partial address information (e.g., a partial association ID or PAID) may be available in PHY headers, such as in a VHT-SIG field, it may be the case that transmitter address is located inside the MAC packet, and thus may be unavailable until PHY layer decoding is successful and therefore not be available to a receiver to perform receive combining at the PHY layer in such instances.

Thus, if it is possible for different transmitters to perform transmissions interleaved between retransmission attempts, such as may be the case if nodes are forced to contend for medium access to perform retransmissions at the same priority level as new transmissions, a receiver attempting to utilize receive combining could introduce buffer corruption by erroneously combining non-identical packets. However, if retransmission frames are guaranteed to be provided with continuity and with little or no possibility of other transmissions being interleaved between an initial transmission and a retransmission (or between the Nth and N+1th retransmission), the receiver may be able to infer that the transmitter of a retransmitted frame is the same as the transmitter of the previous frame, and thus may be able to combine the packets without risk (or at a reduced risk) of causing buffer corruption by doing so.

Accordingly, at least in some embodiments, the second wireless device 404 may determine whether a data frame received by the second wireless device 404 is a new transmission or a retransmission based at least in part on the length of the interval between receiving the data frame and receiving the previous data frame transmission. In other words, at least according to some embodiments, a transmitting device may be considered to indicate to a destination device whether a transmission is an initial transmission or a retransmission using the interval at which the transmission is performed, e.g., such that a retransmission interval may indicate a retransmission, and an interval of at least the minimum interframe interval may indicate a new transmission.

For example, the initial transmission 410 may have been performed at least the minimum interframe interval after a previous transmission occured on the wireless medium used to communicate between the first wireless device 402 and the second wireless device 404, and the second wireless device 404 may be able to determine that the initial transmission 410 is a new transmission based at least in part on receiving the initial transmission 410 at least the minimum interframe interval after the previous transmission on the wireless medium. Similarly, the second wireless device 404 may be able to determine that the retransmission 416 is a retransmission based at least in part on receiving the retransmission at the retransmission interval after receiving the initial transmission 410.

The second wireless device 404 may further consider destination (e.g., recipient address) information, new packet indicator (NPI) information, initial transmission indicator (ITT) information, and/or other types of information included (and potentially available at the PHY layer) in the data frame to determine more particularly that the retransmission 416 of the data frame can be associated with the initial transmission of the data frame (e.g, that the data frame received in the retransmission 416 includes the same physical layer packet as the data frame received in the initial transmission 410). Based on determining that the initial transmission and the retransmission both include the same data frame, the second wireless device 404 may perform receive combining of the initial transmission of the data frame and the first retransmission of the data frame.

Note that if the second wireless device 404 is still unable to successfully decode the data frame received in the retransmission 416, and the first wireless device 402 transmits one or more further (e.g., second, third, etc.) retransmissions, the second wireless device 404 may perform further receive combining (e.g., including combining either or both of the data frames received in the initial transmission 410 and the retransmission 416) when attempting to decode such further data frame retransmissions, e.g., based on determining that such further retransmissions are associated with the previous retransmission(s) and/or initial transmission attempts in a similar manner as previously described herein with respect to the first retransmission.

Thus, at least according to some embodiments, use of a retransmission interval that is less than the minimum interframe interval for new transmissions may prevent or help reduce the likelihood of performing receive combining of different physical layer packets, which may in turn further improve the overall system throughput and reduce individual packet delays.

FIGS. 5-8

FIGS. 5-8 illustrate further considerations and details relating to retransmission techniques, and are not intended to be limiting to the disclosure as a whole. Numerous variations and alternatives to the details provided herein below are possible and should be considered within the scope of the disclosure.

FIG. 5 illustrates an exemplary transmission and retransmission timeline in accordance with a wireless communication system in which retransmissions occur with equal priority as new transmissions. As shown, a wireless device that wishes to perform an initial transmission may wait until a backoff timer expires after a previous packet transmitted on the medium concludes, at which time the initial packet transmission may be performed. After the initial transmission, if no acknowledgement is received in response to the initial packet transmission, the backoff timer may be reset with a random value within the constraints imposed by a minimum interframe space according to the wireless communication system. Once that timer expires, a retransmission of the packet may be performed.

As previously discussed herein, such a system may allow for the possibility that another frame (e.g., transmitted by another wireless device) may be transmitted using the same wireless medium between the initial packet transmission and the packet retransmission. In contrast, FIG. 6 illustrates an exemplary transmission and retransmission timeline in accordance with a wireless communication system in which retransmissions occur with higher priority than new transmissions. The system of FIG. 6 may more particularly be representative of an Wi-Fi communication system in which the acknowledgement interval is a 16 μs SIFS, the retransmission interval is a 25 (16+9) μs PIFS, and the minimum interframe interval is a 34 (16+9+9) μs DIFS. Note that these interval values are provided for illustrative purposes only and are not intended to be limiting; other interval values, for example associated with other versions of Wi-Fi and/or other wireless communication technologies, may alternatively be used, if desired.

As shown, a wireless device may perform an initial transmission (N=1) of a packet to a destination wireless device. In case of a successful initial transmission, the destination wireless device may respond with an acknowledgement at the acknowledgement interval after the initial transmission. In case the initial transmission is unsuccessful, the wireless device may not receive an acknowlegement at the acknowledgement interval after the initial transmission, and so may perform a first retransmission (N=2) of the packet to the destination wireless device at the retransmission interval after the initial transmission. In case of a successful first retransmission, the destination wireless device may respond with an acknowledgement at the acknowledgement interval after the first retransmission.

FIG. 7 is a table illustrating possible NPI and ITI frameworks for attempting to prevent buffer corruption. As shown, when using a NPI, successive packets can be distinguished using a one bit indicator that alternates between 0 and 1 for different packets, such that the initial transmission and all retransmissions of a given packet may have the same value (e.g., either all 0 or all 1) included in the NPI field. Such a technique can help a receiving station identify whether to combine two packets under some circumstances, but may lead to buffer corruption in at least some scenarios. For example, consider a wireless communication scenario in which the receiever's address is available at the PHY layer of received packets, but the sender's address is not available at the PHY layer (e.g., is available at the MAC layer). In such a scenario, if one STA ("STA1") sends a first packet $P_{13,N=1,NPI=0}$ to another STA ("STA3"), which STA3 fails to decode, then a further STA ("STA2") sends a first packet $P_{23,N=1,NPI=0}$ to STA3, STA3 may try to combine $P_{13,N=1}$ with $P_{23,N=1}$ to improve decoding performance. In this case, STA3 may not be able to decode $P_{23,N=1}$ since it was corrupted with $P_{13,N=1}$.

As also shown, when using an ITI, initial transmissions can be distinguished from retransmissions using a one bit indicator that is set to 0 for an initial transmission and set to 1 for a retransmission. Such a technique can also help a receiving station identify whether to combine two packets under some circumstances, but may also lead to buffer corruption in at least some scenarios. For example, consider again a wireless communication scenario in which the receiever's address is available at the PHY layer of received packets, but the sender's address is not available at the PHY layer. In such a scenario, if one STA ("STA1") sends a first packet $P_{13,N=1,M=0}$ to another STA ("STA3"), which STA3 fails to decode, then a further STA ("STA2") sends a first packet $P_{23,N=1,M=0}$ to STA3, STA3 may reset its buffer and store log likelihood ratios (LLRs) received and attempt to decode the packet $P_{23,N=1}$. If the STA3 fails to decode the packet $P_{23,N=1}$, then STA1 sends a retransmission $P_{13,N=2,M=1}$ to STA3, STA3 may think it is a retransmission from STA2 and combine it with the LLRs in the buffer that are actually from STA2. The buffer may thus be corrupted and STA3 may fail to decode the retransmission $P_{13,N=2}$.

In both such scenarios, the buffer may be corrupted due to the lack of a transmitter address available at PHY in combination with the asynchronous transmission. In such scenarios in which packet transmissions occur asynchronously (such as in WLAN systems based on a carrier sense multiple access (CSMA) mechanism), buffer corruption can be unavoidable using NPI or ITI indicators in situations when multiple nodes are trying to send packets to a single node at the same time. A mechanism that allows for retransmissions to be performed in continuity with each other and with the initial transmission, such as described herein at least with respect to FIG. 4, may be able to prevent interleaved transmissions from multiple nodes to a single receiver, and thus may help mitigate the potential for buffer corruption that might otherwise exist, e.g., without such a mechanism.

Figure 8:
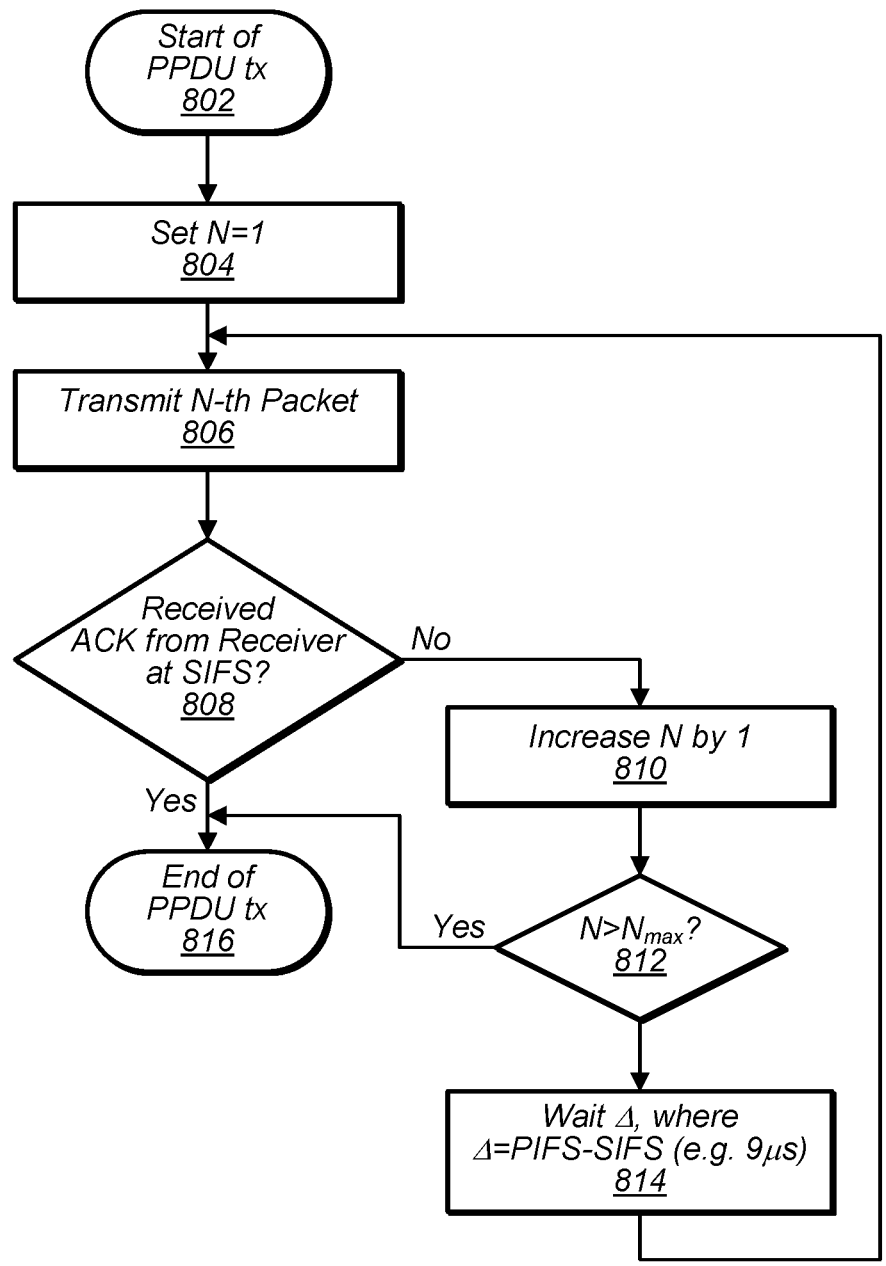
FIG. 8 is a flowchart diagram illustrating an exemplary possible method for a transmitting device to perform a packet transmission in a wireless communication system with continuous retransmissions.

FIG. 8 is a flowchart diagram illustrating an exemplary possible transmitter procedure for performing physical protocol data unit (PPDU) transmission with a continuous retransmission mechanism in a Wi-Fi communication system, according to some embodiments.

As shown, the transmitter may determine to transmit the PPDU (802). For the first transmission, N (i.e., the transmission number) may be set to 1 (804). The transmitter may perform the Nth (in this case, 1st) transmission (806). The transmitter may determine whether an acknowledgement (ACK) has been received from the receiver at an SIFS after transmitting the packet (808). If no ACK is received, the transmitter may increase N by 1 (810). The transmitter may check whether, after increasing N by 1, N is greater than a maximum number of transmissions $N_{MAX}$ (812). If N is not greater than $N_{MAX}$, the transmitter may wait a period of time equal to the difference between the retransmission interval (i.e., PIFS, in this example) and the acknowledgement interval (i.e., SIFS, in this example), for example 9 μs, as one possibility (814). After waiting the specified period of time, the transmitter may perform the Nth transmission (return to 806). The transmitter may continue in such a retransmission loop until an ACK is received from the receiver at the acknowledgement interval, or until $N > N_{MAX}$ is true, from which points the transmitter may exit the loop and complete the PPDU transmission (816).

In the following further exemplary embodiments are provided.

Some embodiments may include a method that includes receiving a first transmission of a data frame according to a wireless communication technology; determining that an attempt to decode the data frame is unsuccessful; and receiving a retransmission of the data frame at a retransmission interval after the first transmission of the data frame, wherein the retransmission interval is less than a minimum interframe interval used by wireless devices for contending for medium access for new transmissions, according to the wireless communication technology.

According to some embodiments, the retransmission interval is greater than an acknowledgement interval used by wireless devices to transmit acknowledgement messages in response to successfully decoded data frames, according to the wireless communication technology.

According to some embodiments, the method can further include performing receive combining of the first transmission of the data frame and the retransmission of the data frame, wherein receiving the retransmission of the data frame at a retransmission interval that is less than the minimum interframe interval prevents (or reduces the probability of) performing receive combining with respect to different physical layer packets.

Some other embodiments can include a method that includes transmitting a data frame according to a wireless communication technology; determining that no acknowledgement is received in response to the data frame within a predetermined acknowledgement interval; and retransmitting the data frame at a retransmission interval, wherein the retransmission interval is greater than the acknowledgement interval and less than a minimum interframe interval used by a wireless device for contending for medium access for new transmissions, according to the wireless communication technology.

According to some embodiments, the wireless communication technology is an IEEE 802.11 wireless communication technology (Wi-Fi), the acknowledgement interval is a short interframe space (SIFS), the retransmission interval is a point coordination function (PCF) interframe space (PIFS), and the minimum interframe interval is a distributed coordination function (DCF) interframe space (DIFS).

According to some embodiments, the retransmission interval is configured to be less than the minimum interframe interval to provide a higher priority for retransmissions than for new transmissions from competing nodes.

Still other embodiments can include a wireless device, including an antenna; a radio operably coupled to the antenna; and a processing element operably coupled to the radio; wherein the antenna, radio, and processing element are configured to implement communication in accordance with any of the preceding examples and/or preceding disclosure.

Yet other embodiments may include an apparatus, comprising a processing element configured to implement a method according to any of the preceding examples and/or preceding disclosure.

Still further embodiments may include a non-volatile computer readable memory medium that stores instructions that, when executed, cause the performance of a method according to any of the preceding examples and/or preceding disclosure.

Embodiments of the present disclosure may be realized in any of various forms. For example some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a STA) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

We claim:

1. An apparatus, comprising:
 a processing element configured to cause a wireless device to:
 receive a first transmission of a data frame according to a wireless communication technology;
 determine that the first transmission is a new transmission based at least in part on receiving the first transmission at least a minimum interframe interval after a previous transmission, wherein the minimum interframe interval is a minimum interframe interval for contending for medium access for new transmissions according to the wireless communication technology;
 attempt to decode the data frame;
 determine that the attempt to decode the data frame is unsuccessful; and
 based at least in part on determining that the attempt to decode the data frame is unsuccessful, receive a retransmission of the data frame at a retransmission interval after the first transmission of the data frame, wherein the retransmission interval is less than a minimum interframe interval for contending for medium access for new transmissions according to the wireless communication technology, and wherein the retransmission interval has a duration equal to a point coordination function (PCF) interframe space (PIFS);

determine that the retransmission of the data frame is a retransmission of the data frame based at least in part on receiving the retransmission of the data frame at the retransmission interval that is after the first transmission of the data frame and equal to the PIFS and further based at least in part on recipient address information comprised in the data frame; and perform receive combining of the first transmission of the data frame and the retransmission of the data frame based at least in part on determining that the retransmission of the data frame is a retransmission of the data frame.

2. The apparatus of claim 1,
wherein the retransmission interval is greater than an acknowledgement interval for transmitting acknowledgement messages in response to successfully decoded data frames according to the wireless communication technology.

3. The apparatus of claim 1,
wherein determining that the retransmission of the data frame is a retransmission of the data frame is further based at least in part on one or more of new packet indicator (NPI) information or initial transmission indicator (ITI) information comprised in the data frame.

4. The apparatus of claim 1,
wherein the wireless communication technology comprises an Institute of Electrical and Electronics Engineers (IEEE) 802.11 wireless communication technology,
wherein the minimum interframe interval comprises a distributed coordination function (DCF) interframe space (DIFS).

5. The apparatus of claim 1,
wherein the retransmission interval being less than the minimum interframe interval provides higher priority for retransmissions than for new transmissions.

6. A wireless device, comprising:
an antenna;
a radio operably coupled to the antenna; and
a processing element operably coupled to the radio;
wherein the antenna, radio, and processing element are configured to:
receive a data frame transmission according to a wireless communication technology;
determine that the data frame transmission is a new transmission if the interval between receiving the data frame transmission and receiving a previous data frame transmission comprises at least a minimum interframe interval for contending for medium access for new transmissions according to the wireless communication technology;
determine that the data frame transmission is a retransmission based at least in part on recipient address information comprised in the data frame and further based at least in part on the interval between receiving the data frame transmission and receiving the previous data frame transmission comprising a retransmission interval according to the wireless communication technology, wherein the retransmission interval has a duration equal to a point coordination function (PCF) interframe space (PIFS), wherein the minimum interframe interval for contending for medium access for new transmissions is greater than the retransmission interval; and
perform receive combining of the data frame transmission and one or more corresponding previously received data frame transmissions based at least in part on determining that the data frame transmission is a retransmission.

7. The wireless device of claim 6,
wherein the retransmission interval is greater than an acknowledgement interval according to the wireless communication technology, wherein according to the wireless communication technology the acknowledgement interval is for transmitting acknowledgement messages in response to successfully decoded data frames.

8. The wireless device of claim 6,
wherein determining whether the data frame transmission is a new transmission or a retransmission is further based at least in part on one or more of new packet indicator (NPI) information or initial transmission indicator (ITI) information comprised in the data frame.

9. The wireless device of claim 6,
wherein when the data frame transmission is determined to be a retransmission, the antenna, radio, and processing element are further configured to:
determine whether the wireless device is an intended recipient of the retransmission based at least in part on recipient address information comprised in the data frame, wherein the recipient address information is comprised in physical layer (PHY) headers of the data frame.

10. The apparatus of claim 1, wherein the processing element is further configured to cause the wireless device to:
attempt to decode the retransmission of the data frame;
determine that the attempt to decode the retransmission of the data frame is unsuccessful; and
based at least in part on determining that the attempt to decode the retransmission of the data frame is unsuccessful, receive a second retransmission of the data frame at the retransmission interval after receiving the retransmission.

11. The wireless device of claim 6, wherein the antenna, radio, and processing element are further configured to:
attempt to decode the data frame transmission;
determine that the attempt to decode the data frame is unsuccessful; and
based at least in part on determining that the attempt to decode the data frame transmission is unsuccessful, receive a second data frame retransmission at the first retransmission interval after receiving the retransmission.

12. A method for operating a wireless device, comprising:
receiving a first transmission of a data frame according to a wireless communication technology;
determining that the first transmission is a new transmission based at least in part on receiving the first transmission at least a minimum interframe interval after a previous transmission, wherein the minimum interframe interval is a minimum interframe interval for contending for medium access for new transmissions according to the wireless communication technology;
attempting to decode the data frame;
determining that the attempt to decode the data frame is unsuccessful; and
based at least in part on determining that the attempt to decode the data frame is unsuccessful, receiving a retransmission of the data frame at a retransmission interval after the first transmission of the data frame, wherein the retransmission interval is less than the minimum interframe interval for contending for medium access for new transmissions according to the wireless communication technology, and wherein the retransmission interval has a duration equal to a point coordination function (PCF) interframe space (PIFS);

determining that the retransmission of the data frame is a retransmission of the data frame based at least in part on receiving the retransmission of the data frame at the retransmission interval that is after the first transmission of the data frame and equal to the PIFS and further based at least in part on recipient address information comprised in the data frame; and performing receive combining of the first transmission of the data frame and the retransmission of the data frame based at least in part on determining that the retransmission of the data frame is a retransmission of the data frame.

13. The method of claim 12,
wherein the retransmission interval is greater than an acknowledgement interval for transmitting acknowledgement messages in response to successfully decoded data frames according to the wireless communication technology.

14. The method of claim 12,
wherein determining that the retransmission of the data frame is a retransmission of the data frame is further based at least in part on one or more of new packet indicator (NPI) information or initial transmission indicator (ITI) information comprised in the data frame.

15. The method of claim 12,
wherein the wireless communication technology comprises an Institute of Electrical and Electronics Engineers (IEEE) 802.11 wireless communication technology,
wherein the minimum interframe interval comprises a distributed coordination function (DCF) interframe space (DIFS).

16. The method of claim 12,
wherein the retransmission interval being less than the minimum interframe interval provides higher priority for retransmissions than for new transmissions.

17. The method of claim 12, the method further comprising:
attempting to decode the retransmission of the data frame;
determining that the attempt to decode the retransmission of the data frame is unsuccessful; and
based at least in part on determining that the attempt to decode the retransmission of the data frame is unsuccessful, receiving a second retransmission of the data frame at the first retransmission interval after receiving the retransmission.

18. The apparatus of claim 1,
wherein when the data frame transmission is determined to be a retransmission, the processing element is further configured to cause the wireless device to:
determine whether the wireless device is an intended recipient of the retransmission based at least in part on recipient address information comprised in the data frame, wherein the recipient address information is comprised in physical layer (PHY) headers of the data frame.

19. The wireless device of claim 6,
wherein the wireless communication technology comprises an Institute of Electrical and Electronics Engineers (IEEE) 802.11 wireless communication technology, and
wherein the minimum interframe interval comprises a distributed coordination function (DCF) interframe space (DIFS).

20. The wireless device of claim 6,
wherein the retransmission interval being less than the minimum interframe interval provides higher priority for retransmissions than for new transmissions.

* * * * *